(12) United States Patent
Pollak et al.

(10) Patent No.: US 7,625,040 B2
(45) Date of Patent: Dec. 1, 2009

(54) ROOF FRAME FOR A MOTOR VEHICLE

(75) Inventors: Martin Pollak, Puchheim (DE);
Mathias Rainer, Tutzing (DE); Boris Koch, Wermelskirchen (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/862,286

(22) Filed: Sep. 27, 2007

(65) Prior Publication Data
US 2008/0073943 A1    Mar. 27, 2008

(30) Foreign Application Priority Data

Sep. 7, 2006   (DE) .................. 10 2006 042 031
Sep. 28, 2006  (DE) .................. 10 2006 046 122

(51) Int. Cl.
*B60J 7/00* (2006.01)

(52) U.S. Cl. .................. 296/216.07; 296/216.08

(58) Field of Classification Search .................
296/216.06–216.08
See application file for complete search history.

(56) References Cited

U.S. PATENT DOCUMENTS 6,367,872 B1 * 4/2002 Bohm et al. ............... 296/214
6,409,258 B1 * 6/2002 Grimm et al. ........... 296/216.08
6,651,815 B1 * 11/2003 Koefelda .................. 206/527

FOREIGN PATENT DOCUMENTS

| DE | 10015504 | 10/2001 |
|----|----------|---------|
| DE | 10149522 | 4/2003  |
| DE | 10163822 | 7/2003  |

* cited by examiner

*Primary Examiner*—Dennis H Pedder
(74) *Attorney, Agent, or Firm*—Fitch Even Tabin & Flannery; John M. Naber

(57) ABSTRACT

A frame for a vehicle sliding sunroof or tilt-slide sunroof is proposed, comprising at least one single-piece frame base element (22), that is embodied as a plastic injection-molded piece and comprises at least one front frame piece (24) and two side stringers (26, 28) that are directed in the vehicle's longitudinal direction. For formation of a light and stiff frame, the frame base element (22) according to the invention is embodied as a composite component, and provided with at least one profile- or cup-shaped inserted piece (38, 40) that serves as a reinforcing element.

10 Claims, 3 Drawing Sheets

FIG. 3
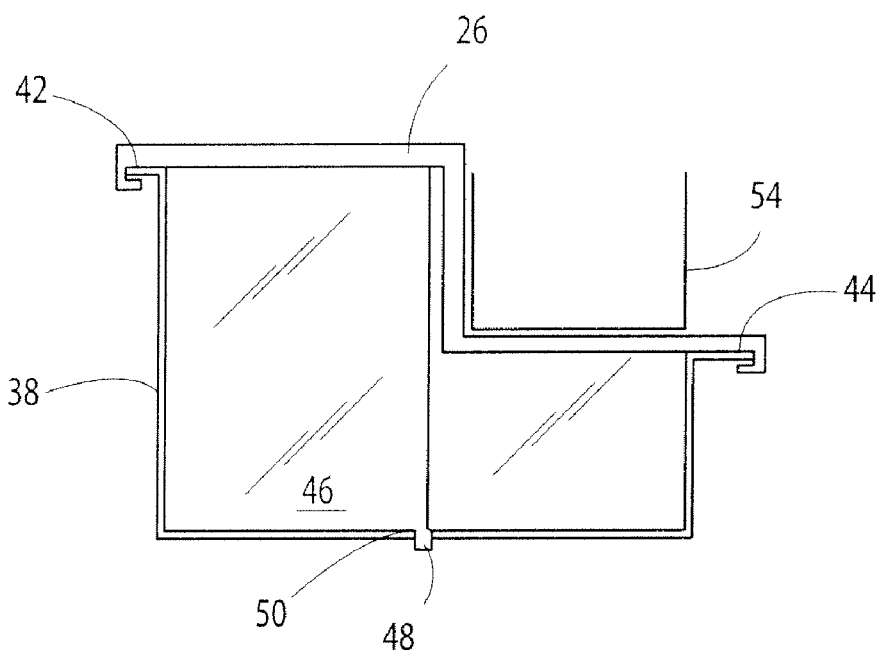
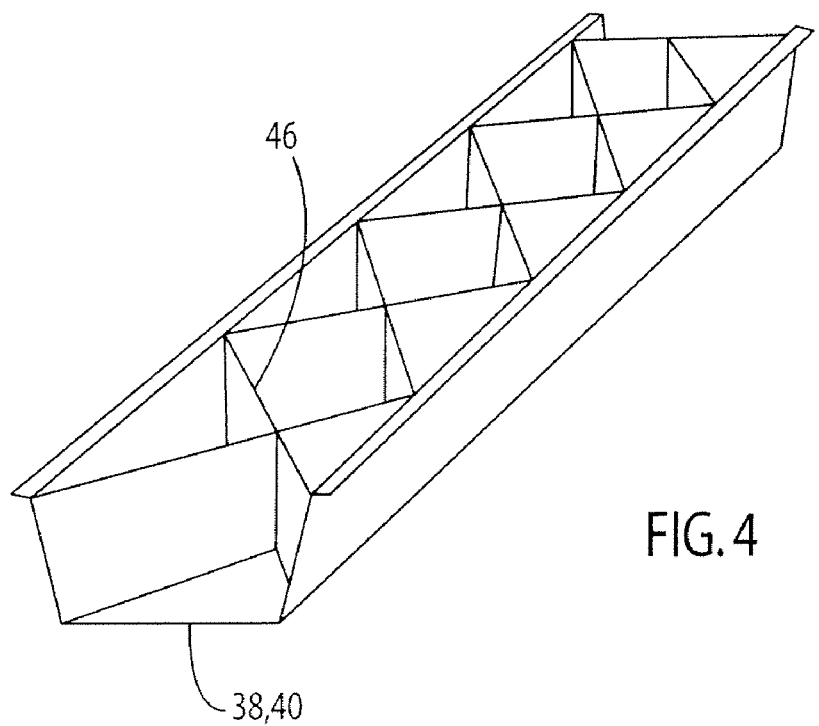
FIG. 4

ROOF FRAME FOR A MOTOR VEHICLE

CROSS REFERENCE TO RELATED APPLICATIONS

This invention relates to, and claims the benefit of priority from DE Application No. 10 2006 046 122.3, filed Sep. 28, 2006.

BACKGROUND OF THE INVENTION

1. Field of the Invention

The invention relates to a frame for a sliding vehicle sunroof or a tilt-slide sunroof with the features of the preamble of patent claim 1.

2. Related Art

One such frame is known, for example, from DE 203 17 140 U1, and formed from a plastic injection-molded piece, that thus is produced from a thermoplastic and that has one front frame part and two side stringers that have one-piece configurations. Guide rails are integrated onto the side stringers, onto which for optional closing or at least partial release of a roof opening, a cover element of the affected sliding sunroof or tilt-slide sunroof is guided. For operation of the cover element, a drive motor can be placed in the area of the front frame piece. Owing to design as a plastic injection-molded piece and the variable shaping capacity connected with that, a multiplicity of functions can be directly integrated with such a frame.

Frames of the type described above can either be attached from above, i.e. from the outside of the vehicle, or also from within, i.e. from the interior of the vehicle. Especially with a frame mounted on the vehicle chassis, great demands are made for the stiffness of the frame itself, which possibly cannot be met with a frame of thermoplastic. The stiffness requirements must then be compensated for by appropriate design measures in the roof areas on which the frame is placed.

In addition, from practical operation it is known that from without, a frame base element embodied as a deep drawing sheet is provided for a sliding sunroof or tilt-slide sunroof to be mounted on a vehicle chassis, which [frame base element] includes a front frame piece and a frame side stringer. Such a frame, which due to material, is of heavier weight and due to fabrication, offers limited shaping options, is as a rule provided with further structural sheet elements. Additionally, with such a sheet frame, a greater investment requirement exists on the part of the manufacturer. Also, the options for functional integration are limited. Additionally, it is expensive to make it corrosion resistant.

Additionally, for example, from DE 198 21 694 A1, a sliding sunroof frame is known that has a multi-component frame base element. The frame base element comprises a front frame piece that can consist of plastic, as well as a side stringer that as a rule consists of aluminum, for guiding a roof cover element. With such a modular design of the sliding sunroof frame, expensive sealing measures must be taken in the transitional areas between the front frame piece produced from plastic and the frame side stringers embodied as extruded aluminum profiles.

SUMMARY OF THE INVENTION

The task that is the basis of the invention is to produce a frame of the kind mentioned initially, that is characterized by low weight, high intrinsic stiffness and the capability of being manufactured at low cost.

This problem is solved according to the invention by the frame with the features of patent claim 1.

Thus the core of the invention consists in implementing a frame that is provided with the support element representing the frame base element, which on the one hand represents a plastic injection-molded part and on the other hand has at least one reinforcement element formed by an inserted piece. For forming a composite component, the reinforcement element is integrated directly into the frame base part when the injection-molded part is shaped. The frame according to the invention is thus provided with a frame base element embodied as a composite component, in which a composite of the injection-molded plastic and the material of the inserted piece is present.

In particular, the inserted piece can be made of metal and be a thin-walled sheet. In this case the inserted piece in particular is a deep-drawn piece, so that when the invention-specific frame is manufactured, not only the specific properties of the materials used, but also the two processing procedures, metal deep drawing and injection molding, add to the cost-effectiveness. Thus the result is a component formed by the frame base element with reliable, reproducible and tight manufacturing tolerances. It is especially manufactured so that a thin-walled, deep-drawn, stamped and still intrinsically unstable sheet piece or profile is inserted into the appropriate injection-molding tool, and the plastic structure with a suitable material, i.e., with a thermoplastic or a duroplastic, is sprayed onto the sheet piece according to one of the injection-molding procedures carried out in the usual way, which reinforces the sheet piece and thus the entire structure. By spraying the plastic structure onto the inserted piece serving as a reinforcing element, thus the thin-walled sheet structure of the inserted piece can be effectively stabilized.

However, it is also conceivable to produce the inserted piece from a carbon-fiber material, a fiber-reinforced thermoplastic or a fiber-reinforced duroplastic, which is advantageous in regard to the weight of the resulting component. As fiber reinforcement of the duroplastic or thermoplastic, carbon, aramid, or glass materials, for example, in the form of fabrics, rovings or mats can be used.

The frame according to the invention thus represents a structure that has great intrinsic stiffness owing to integration of at least one inserted piece and the plastic structure connected with it, which satisfies the stringent requirements that are made in the area of the vehicle chassis and in particular in the area of vehicle roofs.

The frame according to the invention in particular is a sliding sunroof frame that is placed from the exterior of the vehicle, i.e. from above onto a vehicle body shell.

By having the frame base element configured as a plastic injection molded part, an opportunity is offered to integrate multiple additional functionalities on the frame base element. These, for example, are formed by attachment elements, bearing sites, latch hooks, screwed connections, cable clamps and/or the like. Thus, expensive post-processings and mountings can be dispensed with.

With a special embodiment form of the frame according to the invention, the at least partially profile-like structure of the reinforcement element is stabilized and reinforced by a rib structure of the injection-molded frame base piece or element that engages into its profiling.

With a preferred embodiment form of the frame according to the invention, each of the side stringers of the frame base element is provided with at least one inserted piece with profiling, into which a ribbed structure of the injection-molded frame base element can engage. The inserted piece in particular extends in an area between the particular A pillar and the particular B pillar of the motor vehicle, onto which the frame is placed. Especially in these areas of the roof, stringent requirements are made for the motor vehicle's crashworthiness. But also, the inserted piece can extend over the full length of the side stringer.

The ribbed structure that engages into the profiling of the particular inserted piece, especially is a crisscrossed or zigzag ribbed structure. Such a structure is especially effective at countering the tendency of the inserted piece to buckle. But fundamentally any ribbed pattern is possible.

For anchoring of the inserted piece on the plastic of the frame base element, in the area of at least one lateral edge of the inserted piece or pieces, it can be embodied as piping, so that the edge in question of the inserted piece is overlapped by the plastic material. As an alternative or supplement, the frame base element in the area of the edges of the inserted piece or pieces can also include at least one single-piece-construction plastic clamp that overlaps the affected edge. The anchoring elements can thus be formed in one procedural step along with the frame base element when it is injection-molded.

Additionally, it is advantageous if the at least one inserted piece has holes on its base, each of which serving as an anchoring point for the plastic of the frame base element. Then with the injection-molding process, the material placed in the affected injection-molding tool penetrates through the holes of the inserted piece in question, thus causing the inserted piece to be anchored on the plastic.

The inserted piece can be partially uncovered, or be fully encased by the plastic of the frame base element. In the first instance, the inserted piece can especially serve as the basis for attachment of further structural elements of the frame. For example, inserted pieces of the two side stringers of the frame base element can be connected with each other via at least one metallic transverse truss that extends, for example, in a direction transverse to the vehicle. Such a transverse truss, that can be at the height of the B pillar of the vehicle's body shell, is perhaps required, if the vehicle roof in question has a first roof viewing area in the area of the front seats, and a second roof viewing area in the area of the rear seats. The rear roof viewing area can then, for example, be darkened by a roll-up screen, whereby guide paths for the lateral ends of a tensioned bow can be embodied on the side stringers. These guide paths can be formed directly on the plastic of the frame base element.

In addition, a crash console can be attached on the inserted piece placed in the area of the frame base element's side stringer, which [console] is attached in the area of a B pillar with the vehicle chassis in question. Such a crash console can increase the stiffness and stability of the vehicle body shell in the area of the B pillar in question.

In addition, for guiding the roof covering element onto the side stringers of the frame base element, guide rails embodied as aluminum extruded profiles can be integrated. These are preferably supported in the areas of the frame base element that have inserted pieces, and can be fixed in the area of the inserted pieces and/or in the area of the plastic of the frame base element.

To increase the seal integrity of the frame, and improve adhesion of the plastic used to produce the frame base element on the inserted piece, the inserted piece can have a plastic coating. The plastic coating also forms a corrosion protection for an inserted piece made of metal, especially in the area of its edges.

In advantageous fashion, with the frame configured according to the invention, it is also possible to integrate a front and/or rear cowl of the vehicle chassis on the frame base element, which [cowl] is reinforced with an appropriate inserted piece with profiling, into which an injection-molded ribbed structure of the frame base element can engage.

The cowl in question is thus formed directly during the manufacturing process of the frame for the sliding sunroof or tilt-slide sunroof on one procedural step. During mounting of the frame, the ends of the cowl in question then need only to be attached to the particular pillars, i.e. to the A, C or D pillars of the vehicle's body shell.

Further advantages and advantageous embodiments of the subject of the invention can be gleaned from the specification, the drawing and the patent claims.

One embodiment example of a frame according to the invention is depicted schematically in the drawing and is explained in greater detail in the specification that follows. Shown are:

BRIEF DESCRIPTION OF THE DRAWINGS

FIG. 3: a section through a side stringer of the roof frame along the line III-III in FIG. 2;

FIG. 4: an inserted piece of the roof frame with a plastic crisscross ribbed structure that engages into it.

DETAILED DESCRIPTION OF THE PREFERRED EMBODIMENTS

Figure 1:
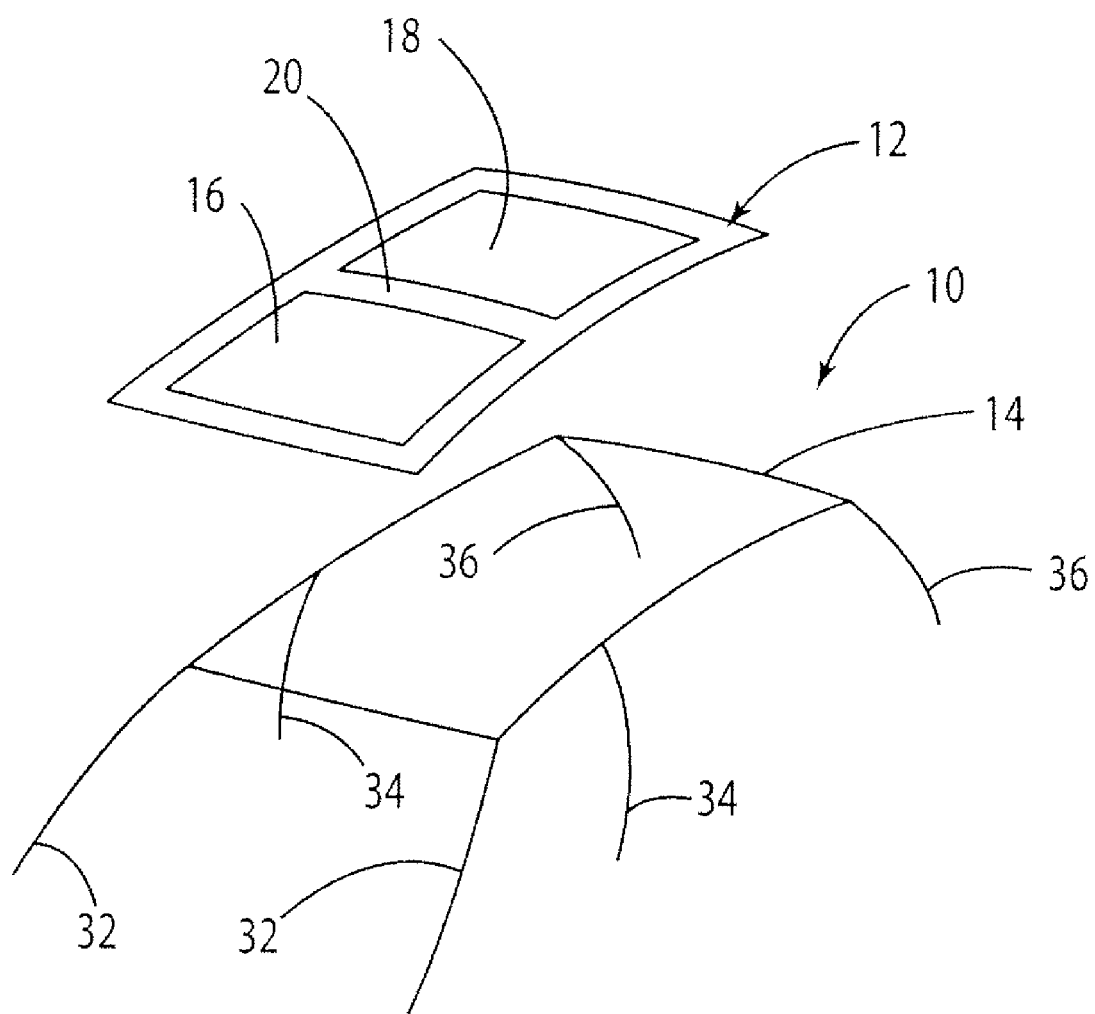
FIG. 1: a roof area of a motor vehicle with a roof frame designed according to the invention.

FIG. 1 depicts a motor vehicle 10 that is equipped with a vehicle roof embodied as a panorama roof. For this, the vehicle roof has a roof frame 12, that is embodied as a frame from above on a chassis frame 14, thus as a so-called top-load frame, and represents a sliding sunroof of motor vehicle 10.

To form a panorama roof that extends in the vehicle's longitudinal direction over the entire passenger compartment of motor vehicle 10, the roof frame has a front roof aperture 16 and a rear roof aperture 18. The front roof aperture 16 and the rear roof aperture 18 are separated from each other by a transverse truss 20. If desired, front roof aperture 16 can be closed by a cover element, not shown in greater detail, or at least partially released. The rear roof aperture 18 is covered by a rigidly mounted transparent glass or polycarbonate pane element. The two roof apertures 16 and 18 can be darkened by a rollup screen not shown here in greater detail.

Figure 2:
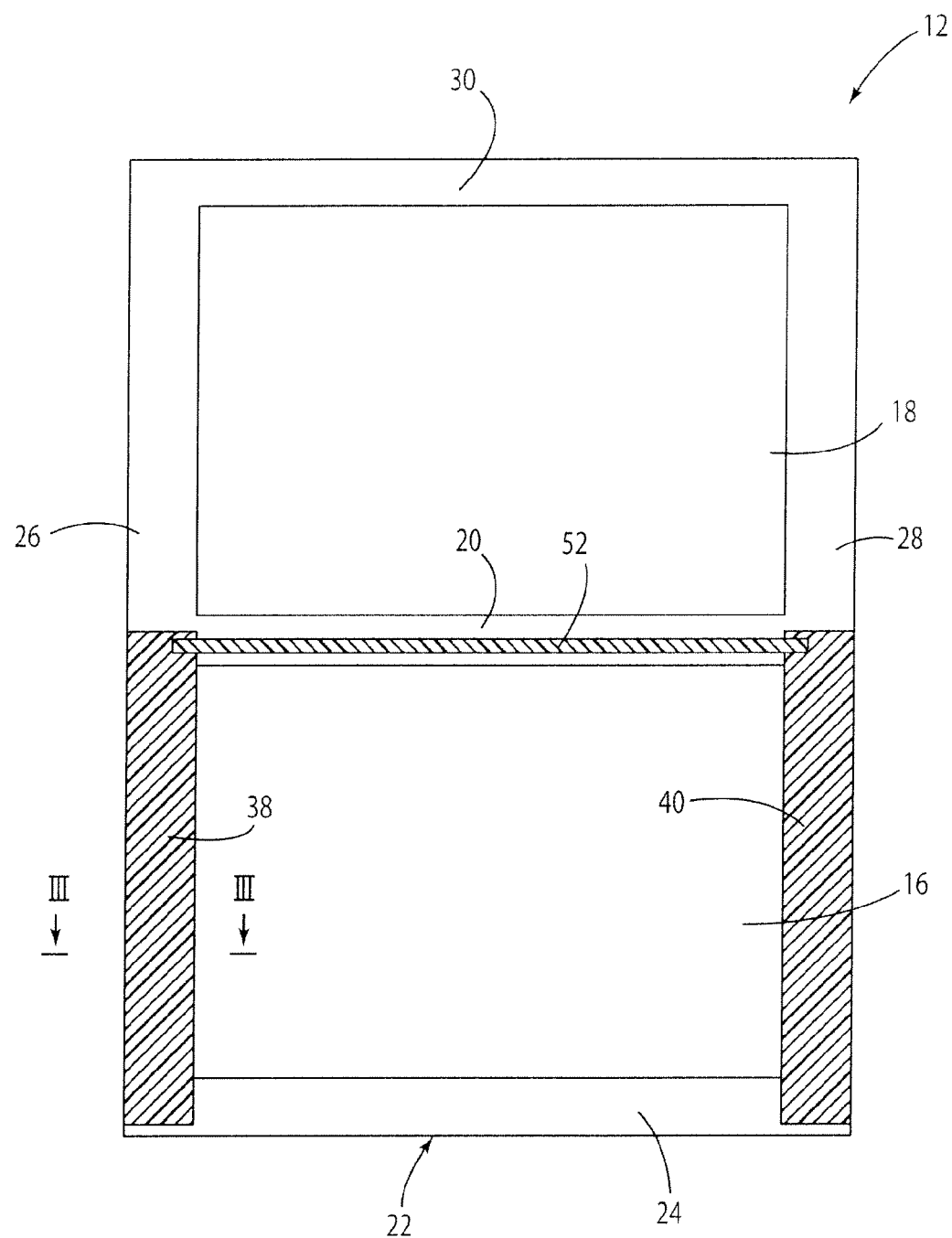
FIG. 2: a perspective bottom view of the roof frame, placed alone.

The frame 12 depicted in FIG. 2 placed alone includes a single-piece frame base element 22 that is a carrying element and a front frame piece 24, two side stringers 26 and 28 that extend in the vehicle's longitudinal direction, a rear frame piece 30 as well as the center truss 20. The front frame piece 24 is placed in the area of the A pillars 32, the transverse truss 20 in the area of the B pillars 34, and the rear frame piece 30 in the area of the C pillars 36 of the vehicle's chassis.

For example, in the area of the front frame piece, a drive motor for the covering element is placed for opening and closing front roof opening 16, which is guided laterally in the area of side stringers 26 and 28. A drive motor for the two roll-up screens can be placed in the area of transverse truss 20 that connects the two side stringers 26 and 28.

Frame base element 22 is a plastic injection-molded piece. To increase the stiffness of this plastic injection-molded piece, in the area of side stringers 26 and 28, an inserted piece 38 or 40 consisting of a metal sheet is provided, that extends between front frame piece 24 and transverse truss 20, and serves as a reinforcement element. Inserted pieces 38 and 40 are each embodied as deep-drawing pieces and, as especially be gleaned from FIGS. 3 and 4, have a profiling that in cross section is U-profile-shaped. Thus, inserted pieces 38 and 40 are each cup- and profile-shaped, respectively. Alternatively it is also conceivable to provide inserted pieces over the entire length of the side stringers.

Inserted pieces 38 and 40 are each so anchored on the plastic of the frame base element 22, that their edges 42 and 44 are overlapped in piping fashion by the plastic of frame base element 22.

Additionally, the plastic of frame base element 22 has a crisscross ribbed structure 46 which, as can be gleaned from FIG. 4, is injected into the profiling of each of the inserted pieces 38 and 40, and thus stabilizes the structure of inserted piece 38 or 40 that serves as a reinforcing element.

Additionally, the ribbed structure 46 has foot points 48 that engage into the holes 50 of each inserted piece 38 and 40, and thus additionally anchor inserted piece 38 and 40 on the plastic of frame base element 22.

For further stabilization and reinforcement of the roof structure, inserted pieces 38 and 40, in the area of transverse truss 20 are connected with each other by means of a metallic transverse support 52, which thus represents a center reinforcement for the roof structure.

The frame according to the invention combines, as a composite component, the positive qualities of plastic and the strength and stability advantages of steel, from which inserted pieces 38 and 40 are manufactured. Inserted pieces are used only at the places at which special demands are made for crashworthiness of the vehicle in question, which in the present example is the case in the area between so-called A pillars 32 and so-called B pillars 34. Also, due to embedding of the inserted pieces in plastic, if necessary, one can do away with a so-called KTL surface coating to improve the corrosion behavior of the sheet pieces.

What is claimed is:

1. A frame, comprising:
    at least a one-piece tilt-slide sunroof frame base element which is embodied as a plastic injection-molded piece and comprises at least one front frame piece and two side stringers directed in the vehicle's longitudinal direction, wherein the frame base element is embodied as a composite component;
    at least one inserted piece anchored at each of a lateral edge of the stringer and shaped to form a cavity between said stringer and said insert, whereby reinforcement is provided;
    an injection-molded ribbed structure of the injection-molded frame base element engaged and encased into the cavity; and
    a transverse truss having a transverse carrier attached substantially at right angles to the side stringers.

2. The frame of claim 1, wherein each of the side stringers comprise at least one "U" shaped inserted piece, onto which the plastic of the injection-molded frame base element is sprayed.

3. The frame of claim 1, wherein at least one inserted piece is made of metal.

4. The frame of claim 1, wherein the plastic of the frame base element is reinforced with glass fibers.

5. The frame of claim 1, wherein the ribbed structure is a crisscrossed or zigzag ribbed structure.

6. The frame of claim 1, wherein the plastic of the frame base element in the area of at least one of a lateral edge of the inserted piece or pieces is embodied to be piping-shaped and overlaps the edge in question.

7. The frame of claim 6, wherein the plastic of the frame base element in the area of the at least one lateral edge of the inserted piece or pieces comprises at least one plastic clamp overlapping this edge.

8. The frame of claim 1, wherein the inserted piece has holes, which serve as anchoring points for the plastic of the frame base element.

9. The frame of claim 1, wherein the transverse carrier is matallic.

10. The frame of claim 1, wherein the inserted piece has a plastic coating.

\* \* \* \* \*